(12) United States Patent
Cunagin

(10) Patent No.: US 9,187,139 B2
(45) Date of Patent: Nov. 17, 2015

(54) TRUCK FRONT END ATTACHMENT MOUNT

(71) Applicant: Bill B Cunagin, Litchfield, IL (US)

(72) Inventor: Bill B Cunagin, Litchfield, IL (US)

( * ) Notice: Subject to any disclaimer, the term of this patent is extended or adjusted under 35 U.S.C. 154(b) by 143 days.

(21) Appl. No.: 14/033,663

(22) Filed: Sep. 23, 2013

(65) Prior Publication Data

US 2015/0082599 A1    Mar. 26, 2015

Related U.S. Application Data

(62) Division of application No. 13/235,712, filed on Sep. 19, 2011, now Pat. No. 8,450,307.

(51) Int. Cl.
| | | |
|---|---|---|
| *B23P 19/04* | (2006.01) | |
| *B62D 25/08* | (2006.01) | |
| *B62D 21/15* | (2006.01) | |
| *B60R 19/18* | (2006.01) | |
| *B60P 3/12* | (2006.01) | |
| *B60D 1/07* | (2006.01) | |
| *E01H 5/06* | (2006.01) | |
| *B62D 49/04* | (2006.01) | |

(52) U.S. Cl.
CPC .............. *B62D 49/04* (2013.01); *B23P 19/04* (2013.01); *B60D 1/075* (2013.01); *B60R 2019/1886* (2013.01); *B62D 21/152* (2013.01); *B62D 25/085* (2013.01); *E01H 5/06* (2013.01); *E01H 5/061* (2013.01); *Y10T 29/49826* (2015.01); *Y10T 29/49895* (2015.01); *Y10T 29/49897* (2015.01); *Y10T 29/49904* (2015.01)

(58) Field of Classification Search
CPC .... B23P 19/04; B62D 25/085; B62D 21/152; B62D 49/04; B60R 2019/1886; B60P 3/125; E01H 5/06; E01H 5/061; B60D 1/075; Y10T 29/49826; Y10T 29/49895; Y10T 29/49897; Y10T 29/49904
USPC ............ 296/193.09, 203.02, 204, 10, 100.07, 296/100.18, 39.2; 180/312; 29/464, 465, 29/469, 57; 37/231; 172/817; 280/476.1, 280/405.1; 414/563, 607
See application file for complete search history.

(56) References Cited

U.S. PATENT DOCUMENTS

| | | | | |
|---|---|---|---|---|
| 2,710,464 A | * | 6/1955 | Husting | 37/231 |
| 3,410,008 A | * | 11/1968 | Standfuss | 37/231 |
| 3,412,489 A | * | 11/1968 | Klaprodt et al. | 37/231 |
| 3,828,449 A | * | 8/1974 | Miceli | 37/283 |
| 3,987,562 A | * | 10/1976 | Deen et al. | 37/231 |
| 4,074,448 A | * | 2/1978 | Niemela | 37/234 |
| 4,127,951 A | * | 12/1978 | Hatch | 37/231 |
| 4,279,084 A | * | 7/1981 | Low et al. | 37/236 |
| 4,421,449 A | * | 12/1983 | Cotton | 414/685 |

(Continued)

OTHER PUBLICATIONS

Industry Update; Chassis Corner; Kenworth to Add Factory-Installed Front Frame Brackets to Medium-Duty Trucks; www.kenworth.com.

*Primary Examiner* — Jermie Cozart
*Assistant Examiner* — Bayan Salone
(74) *Attorney, Agent, or Firm* — Michael P. Mazza, LLC

(57) ABSTRACT

An attachment mount for the front end of a truck, which can fit trucks with full-width or tapering chassis. The attachment mount may include a front member for supporting a front-end truck attachment, and a distribution member, The distribution member may be attached to the vehicle chassis and to the front member, so that the attachment mount spreads stresses originating from downwardly-directed forces exerted on the front member by the attachment, to the front portion of the vehicle chassis.

11 Claims, 9 Drawing Sheets

(56) References Cited

U.S. PATENT DOCUMENTS

| | | | |
|---|---|---|---|
| 5,353,530 A * | 10/1994 | Pieper | 37/231 |
| 5,568,694 A * | 10/1996 | Capra et al. | 37/231 |
| 5,674,046 A * | 10/1997 | Meyer | 414/686 |
| 5,815,956 A * | 10/1998 | Lavin et al. | 37/241 |
| 6,178,669 B1 * | 1/2001 | Quenzi et al. | 37/231 |
| 6,276,076 B1 * | 8/2001 | Quenzi et al. | 37/231 |
| 6,711,837 B2 * | 3/2004 | Bloxdorf et al. | 37/231 |
| 7,097,236 B2 * | 8/2006 | Andre et al. | 296/187.04 |
| 7,261,322 B2 * | 8/2007 | Ito et al. | 280/781 |
| 7,461,890 B2 * | 12/2008 | Yatsuda | 296/203.02 |
| 8,007,035 B2 * | 8/2011 | Jyo et al. | 296/193.09 |
| 8,246,271 B2 * | 8/2012 | Verhoff | 404/117 |
| 8,356,838 B2 * | 1/2013 | Beuss et al. | 280/781 |
| 8,393,669 B2 * | 3/2013 | Ajisaka | 296/187.09 |
| 8,540,307 B2 * | 9/2013 | Cunagin | 296/193.09 |
| D725,008 S * | 3/2015 | Peltola et al. | D12/169 |
| 2005/0016033 A1 * | 1/2005 | Schmeichel | 37/231 |
| 2009/0307938 A1 * | 12/2009 | Koch et al. | 37/231 |
| 2010/0078969 A1 * | 4/2010 | Boettcher et al. | 296/193.09 |
| 2010/0096886 A1 * | 4/2010 | Yoshino et al. | 296/193.09 |
| 2011/0025035 A1 * | 2/2011 | Beuss et al. | 280/781 |
| 2012/0019027 A1 * | 1/2012 | Tashiro et al. | 296/193.09 |

\* cited by examiner

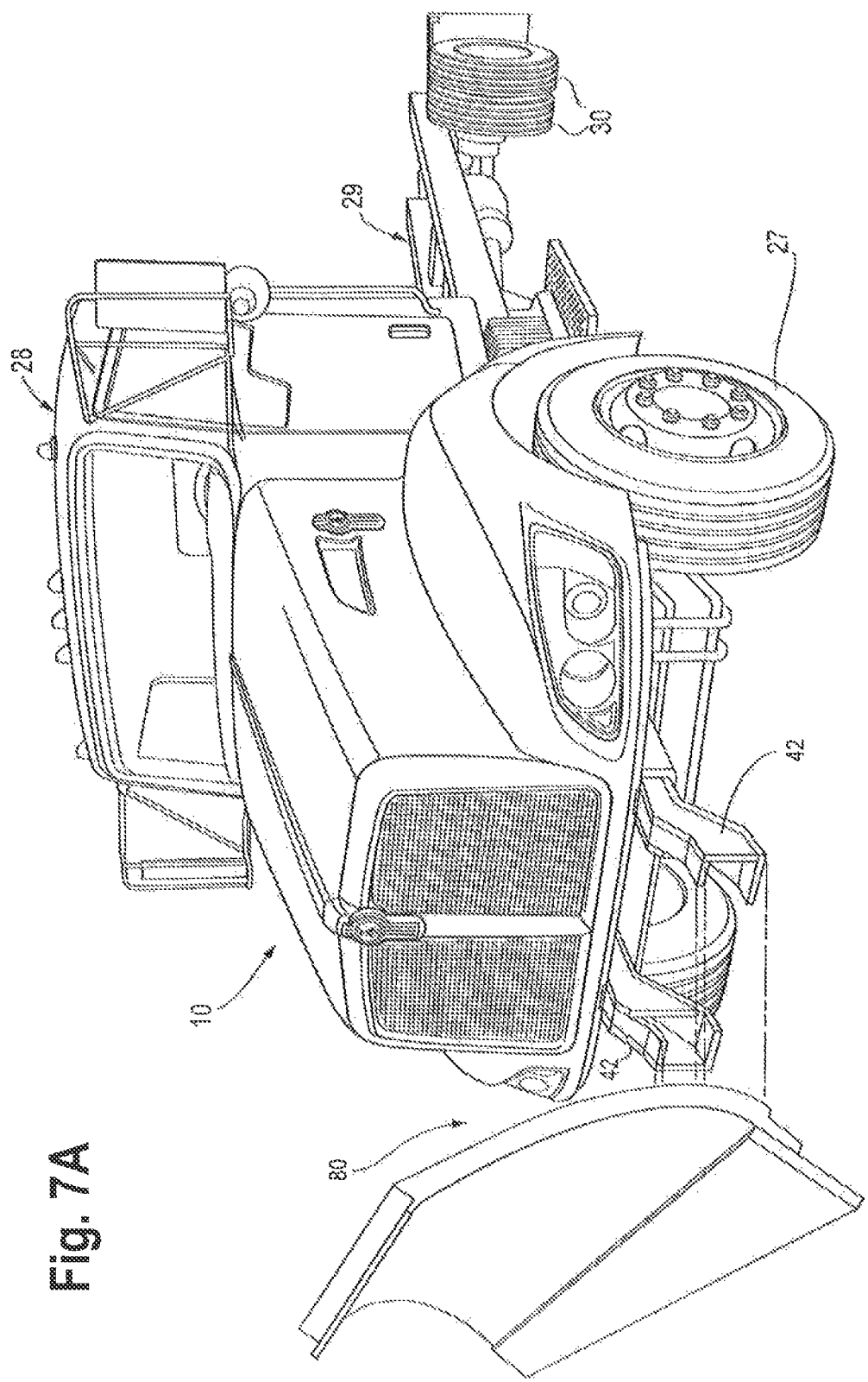

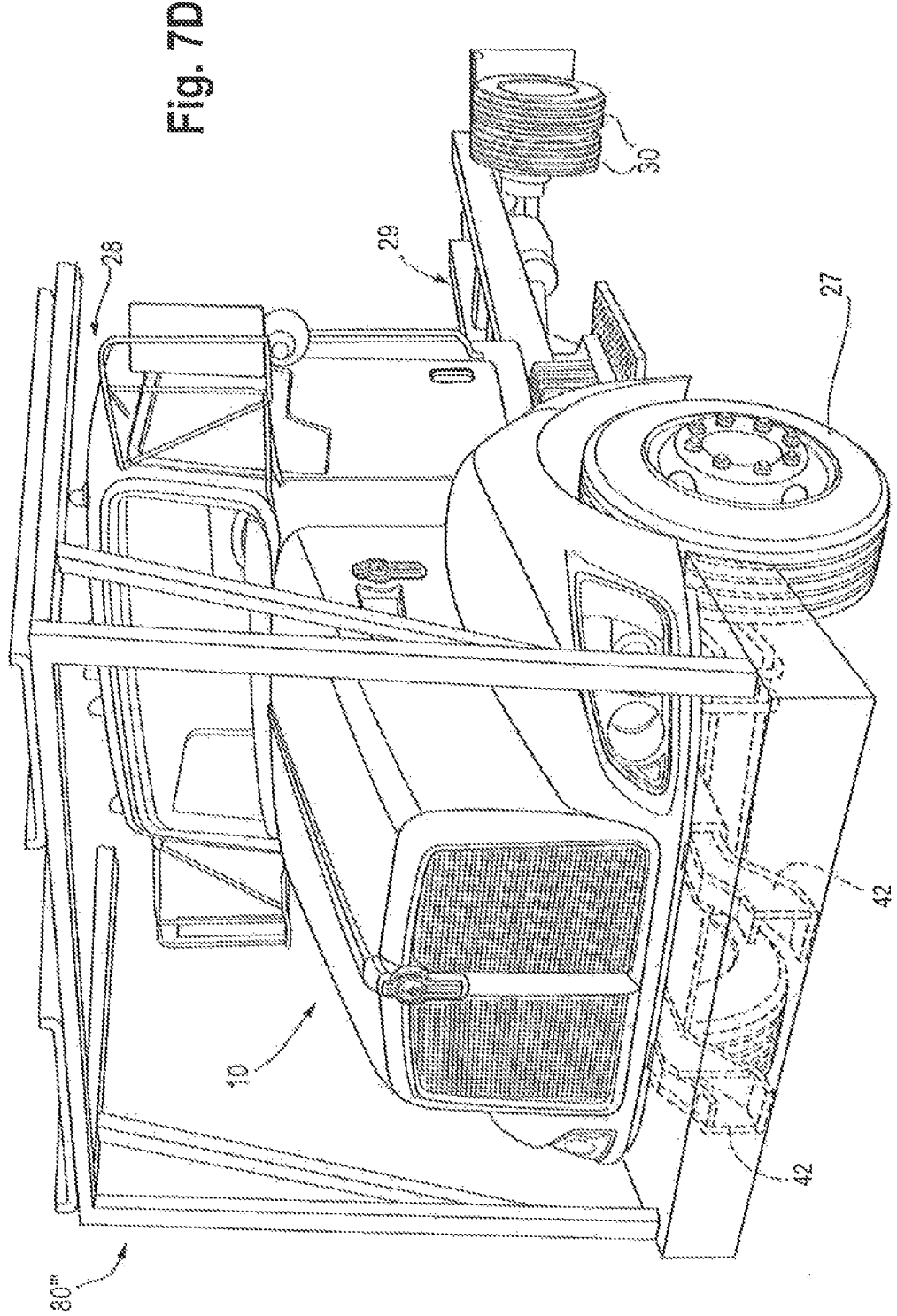

TRUCK FRONT END ATTACHMENT MOUNT

CLAIM FOR PRIORITY TO PRIOR APPLICATION

This is a divisional application claiming priority from U.S. Ser. No. 13/235,712, titled "Truck Front-End Attachment Mount", filed Sep. 19, 2011.

BACKGROUND OF THE INVENTION

The present invention relates to attachment mounts for the front end of trucks, which can be used to mount truck accessories such as but not limited to snowplows, winches and cab racks for supporting vehicles.

A variety of truck front end attachment mounts are known. These are typically after-market attachment mounts, which are often labor-intensive to install. Kenworth Truck Company (Kirkland, Wash.) manufactures Class 6 and 7 trucks, and has recently introduced a new front end, tapered chassis to these trucks. Kenworth has also introduced a front frame bracket package designed to fit its new, tapered chassis. However, Kenworth's front frame bracket package is labor-intensive and expensive to install. Other known front frame truck attachment mounts are also cumbersome, labor-intensive and not designed to work with non-standard chassis, such as Kenworth's new tapered chassis. Front end attachment mounts must also be strong and durable, as in the case of supporting cab racks, for example, the mounts must support thousands of pounds of downward force.

Accordingly, there is a need for a new truck front end attachment mount which is strong and durable, which can be obtained relatively inexpensively and quickly attached, and which can be used with different chassis, including non-standard tapered chassis.

SUMMARY OF THE INVENTION

The objects mentioned above, as well as other objects, are solved by the present invention, Which overcomes disadvantages of prior truck front end attachment mounts, While providing new advantages not believed associated with. known attachment mounts.

In one preferred embodiment, an attachment mount is provided for the front end of a truck having a vehicle chassis. The attachment mount preferably includes a front member for supporting a front-end truck attachment, and a distribution member located in a front portion of the vehicle chassis. The distribution member may be attached to the vehicle chassis and to the front member, to spread stresses originating from downwardly directed forces exerted on the front member by the attachment, to the front portion of the vehicle chassis.

The attachment mount may be used to mount various attachments to the front end of the truck, such as but not limited to: a snow plow; a winch; a blade; a bumper extension for a pump or pump motor; and a. cab rack for supporting vehicles.

Preferably, the method of attachment of the mount to the truck accommodates trucks having differing vehicle chassis widths, so that the attachment mount may be used with full-width truck chassis, as well as with truck chassis that taper, width-wise, in a forward direction. The attachment mount may also be used with Class 4, 5, 6, 7 or 8 trucks, for example.

In one preferred embodiment, a front portion of the front member is a partial tube with a generally U-shaped front cross-section. A front portion of the front member may protrude from the front of the truck, to facilitate mounting an attachment. The front member may have a longitudinal axis which includes two planar sections connected by a diagonal section. The front member may be directly attached to a bumper bracket of the truck, and may be indirectly attached to the distribution member through a connecting bracket of the truck, such as a bumper bracket or a spring bracket.

The distribution member may include a metal plate with a portion, such as a rear portion, that is preferably attached to the main frame of the truck.

The attachment mount may include left and right pair of mounts, with each left and right pair including a front member and a distribution member. The attachment mount may also include a single, integrated mount that ties in to both sides of the front portion of the truck chassis, such as using a single integrated front member, and a single integrated distribution member.

In a preferred embodiment, the total weight of the attachment mount (e.g., left and right sides, including welding and painting) is less than about 100 pounds. More preferably, the mount's total weight is less than about 75 pounds, and most preferably is less than about 60 pounds.

In another preferred embodiment, a method for securing an attachment mount to the front end of a truck having a vehicle chassis is provided. A front member is provided, configured to support a front-end truck attachment. A distribution member is also provided, located in a front portion of the vehicle chassis. The front member and the distribution member, which together form the attachment mount, may be attached to the vehicle chassis and to each other, enabling the attachment mount to spread stresses originating from downwardly-directed forces exerted on the front member by the attachment, through the front portion of the vehicle chassis.

In a particularly preferred embodiment of the method of the present invention, during the process of securing the attachment mount to the front end of the truck, the only preexisting truck parts that are removed and replaced are fasteners.

DEFINITION OF CLAIM TERMS

The terms used in the claims of the patent as filed and are intended to have their broadest meaning consistent with the requirements of law. Where alternative meanings are possible, the broadest meaning is intended, All words used in the claims are intended to be used in the normal, customary usage of grammar and the English language.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIGS. 7A-7D are perspective views showing various front-end truck attachments that may be used.

The components in the drawings are not necessarily to scale, emphasis instead being placed upon dearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
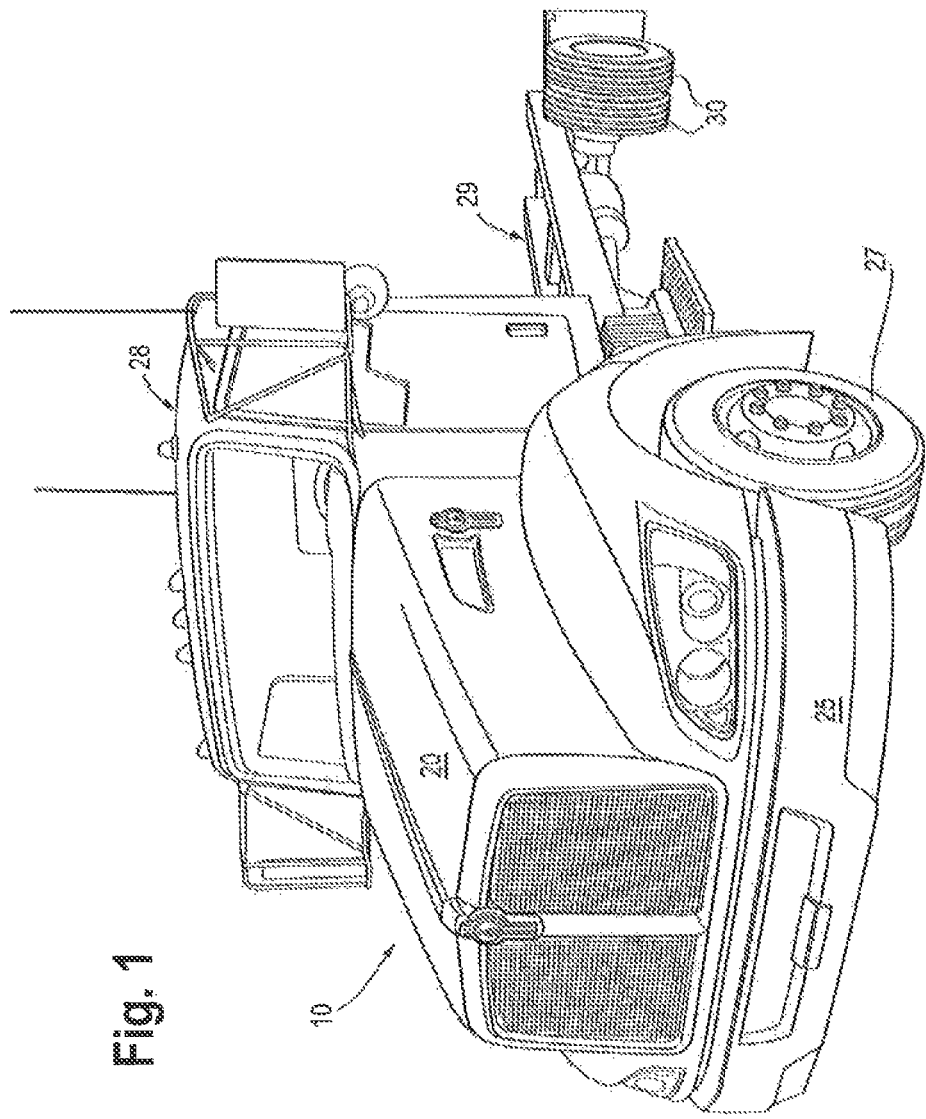
FIG. 1 is a front and side perspective view of a Kenworth truck with a front-end, tapered chassis.

Referring first to FIG. 1, a truck, designated generally with reference numeral 10, has a cab 28 that includes a front hood 20, a front bumper 25 and front wheels 27. Truck 10 also has a rear vehicle chassis 29 and rear wheels 30.

Figure 2:
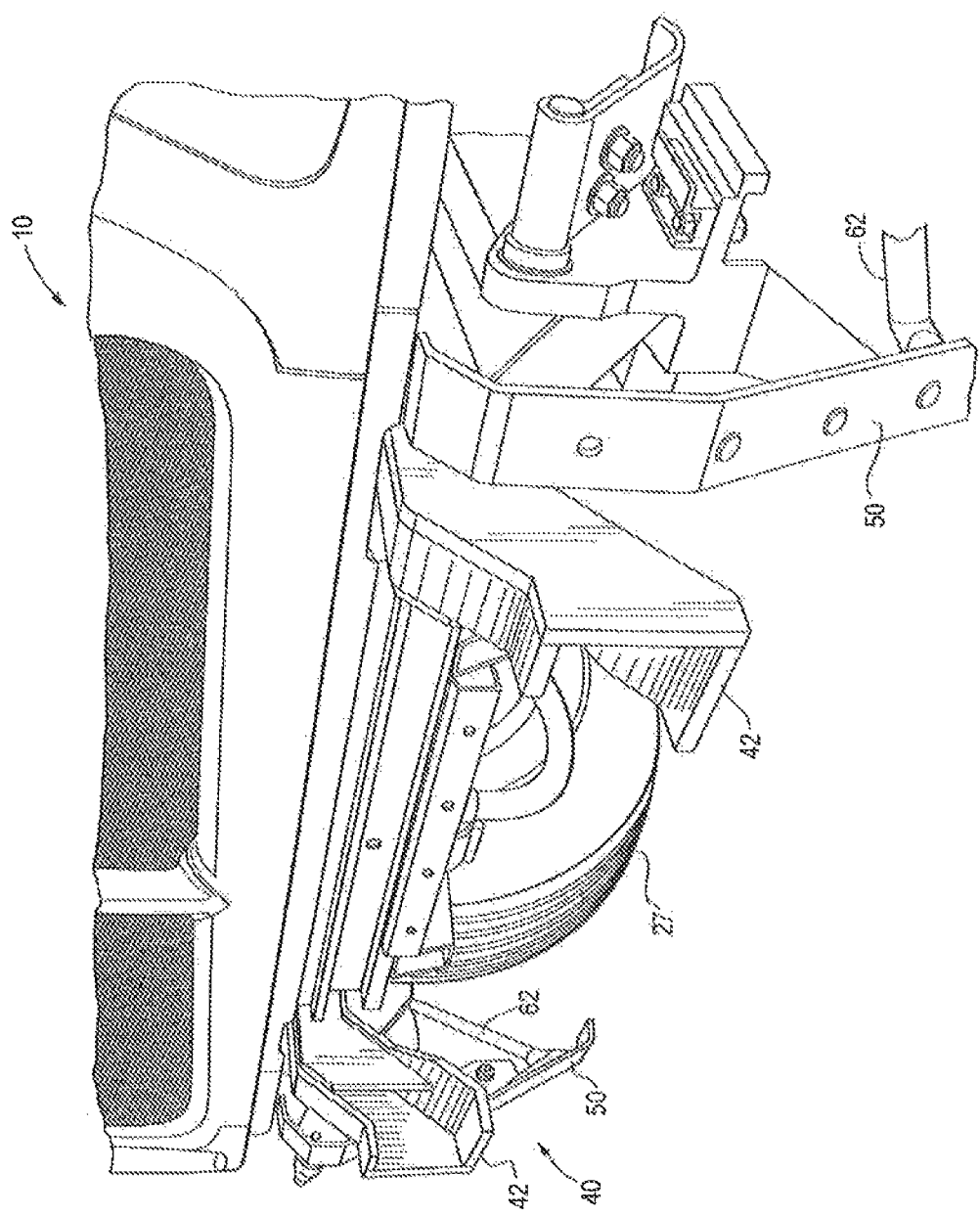
FIG. 2 is a partial view of FIG. 1, with the front bumper removed.
Figure 3:
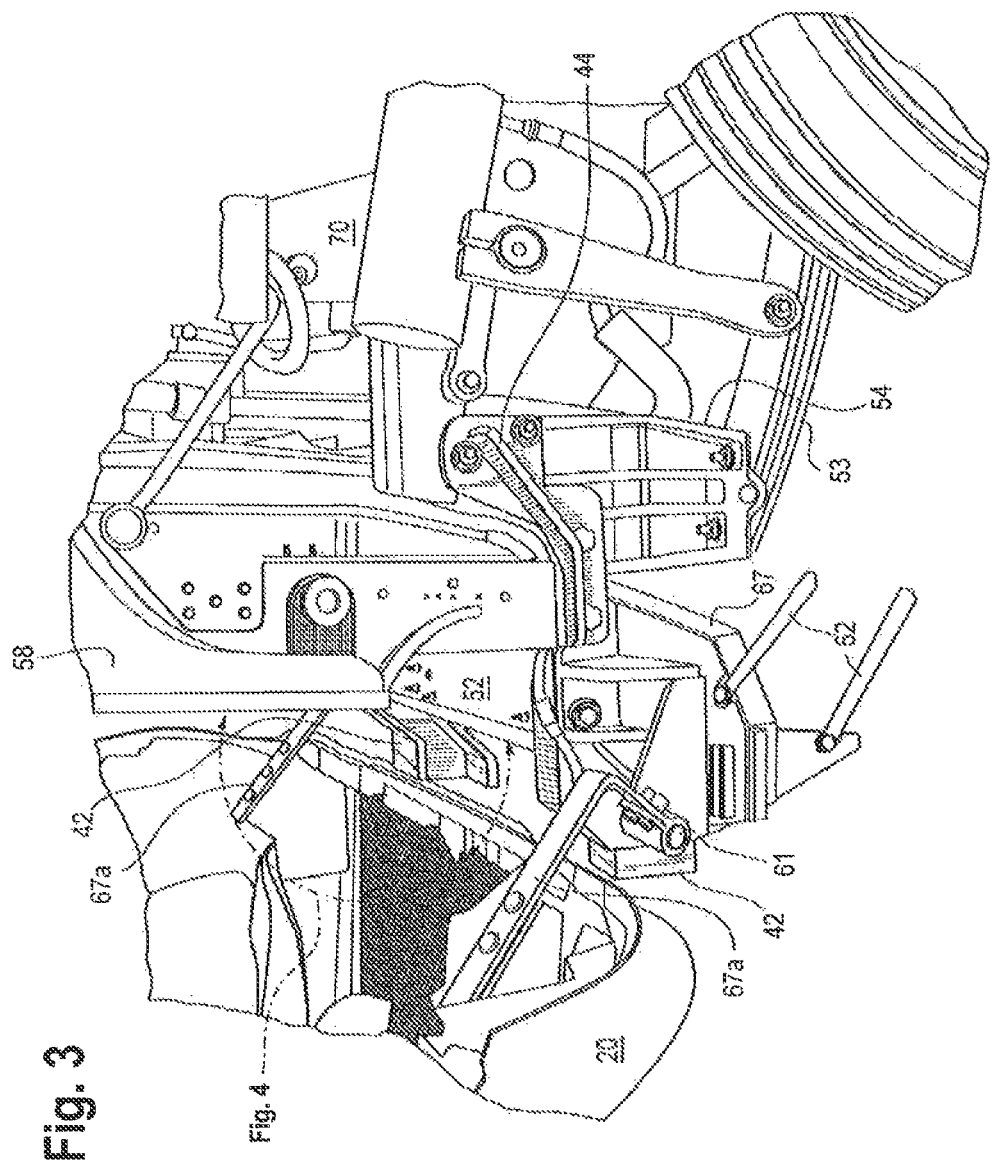
FIG. 3 is a side perspective view of the Kenworth truck shown in FIG. 1, with the front hood open (the hood swings counterclockwise to open), showing a preferred embodiment of the present invention in stippling.
Figure 4:
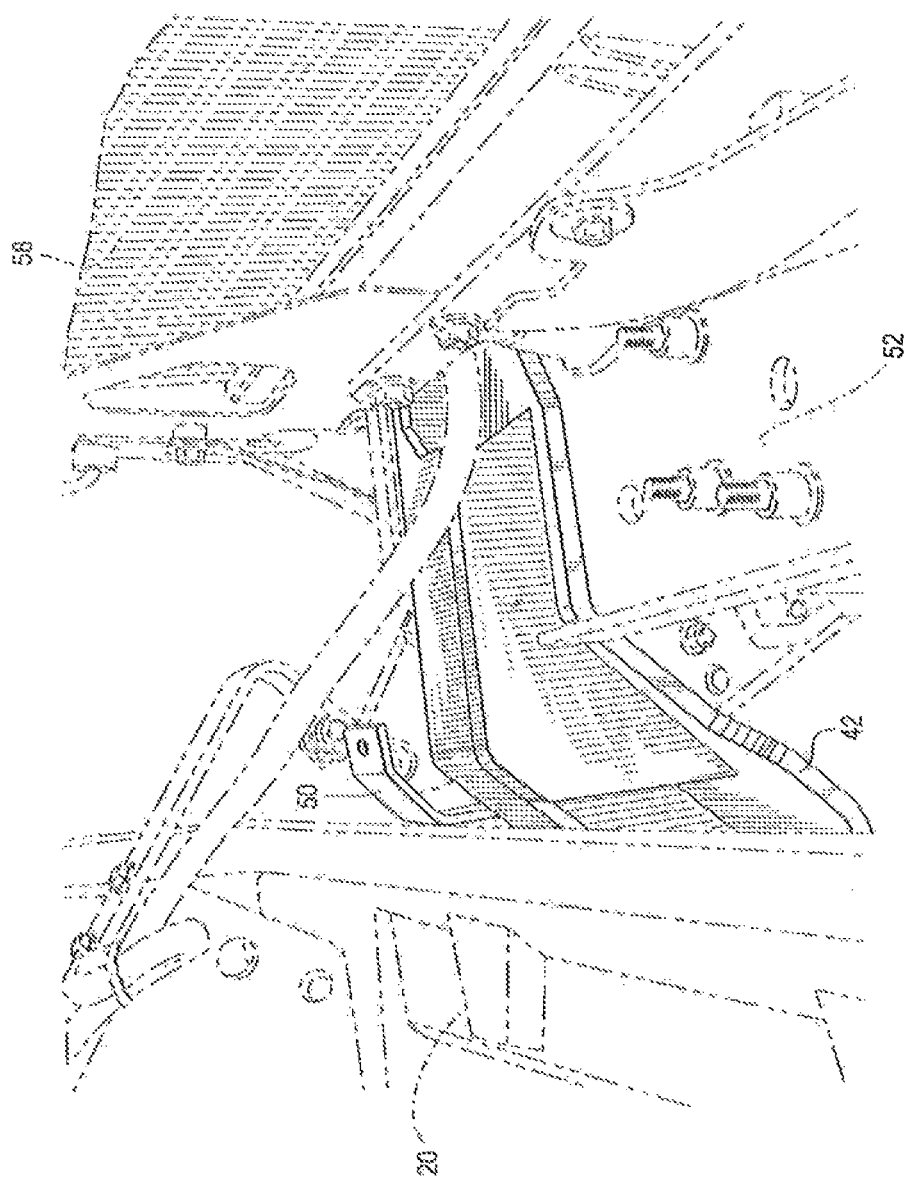
FIG. 4 is an enlarged, side perspective view of components shown in the circled portion of FIG. 3.

Referring to FIG. 2, with front bumper 25 removed, a preferred embodiment of the present invention, truck front end attachment mount 40, is revealed. Persons of ordinary skill in the art will appreciate that attachment mount 40 may be made from one integral piece, or may constitute two separate "left" and "right" side portions, as shown and described in the drawings.

Referring now to FIGS. 2-5, by way of background and prior to a fuller discussion of the preferred embodiment of the invention, front end truck components shown include: front bumper mounting bracket 50, to which front bumper 25 attaches; front springs 53 use in the suspension of the front frame or chassis; front spring hanger bracket 54, for supporting the leaf springs; struts 62 for supporting bumper 20; end portion 57, which the double arrow indicating the end of the main frame or chassis before the taper of the front chassis begins; front cross member and radiator support 52, with upstanding flanges 52a and apertures 52b; supporting plate 67 for hood hinge bracket; safety cover 70 over the fan blades (the engine is behind this cover); radiator 58; hood hinge bracket 60, for supporting hood hinge 61; and front bumper mounting bracket 50. These components and their attachment and inter-relationship are well. known. to persons of ordinary skill in the art.

Figure 5:
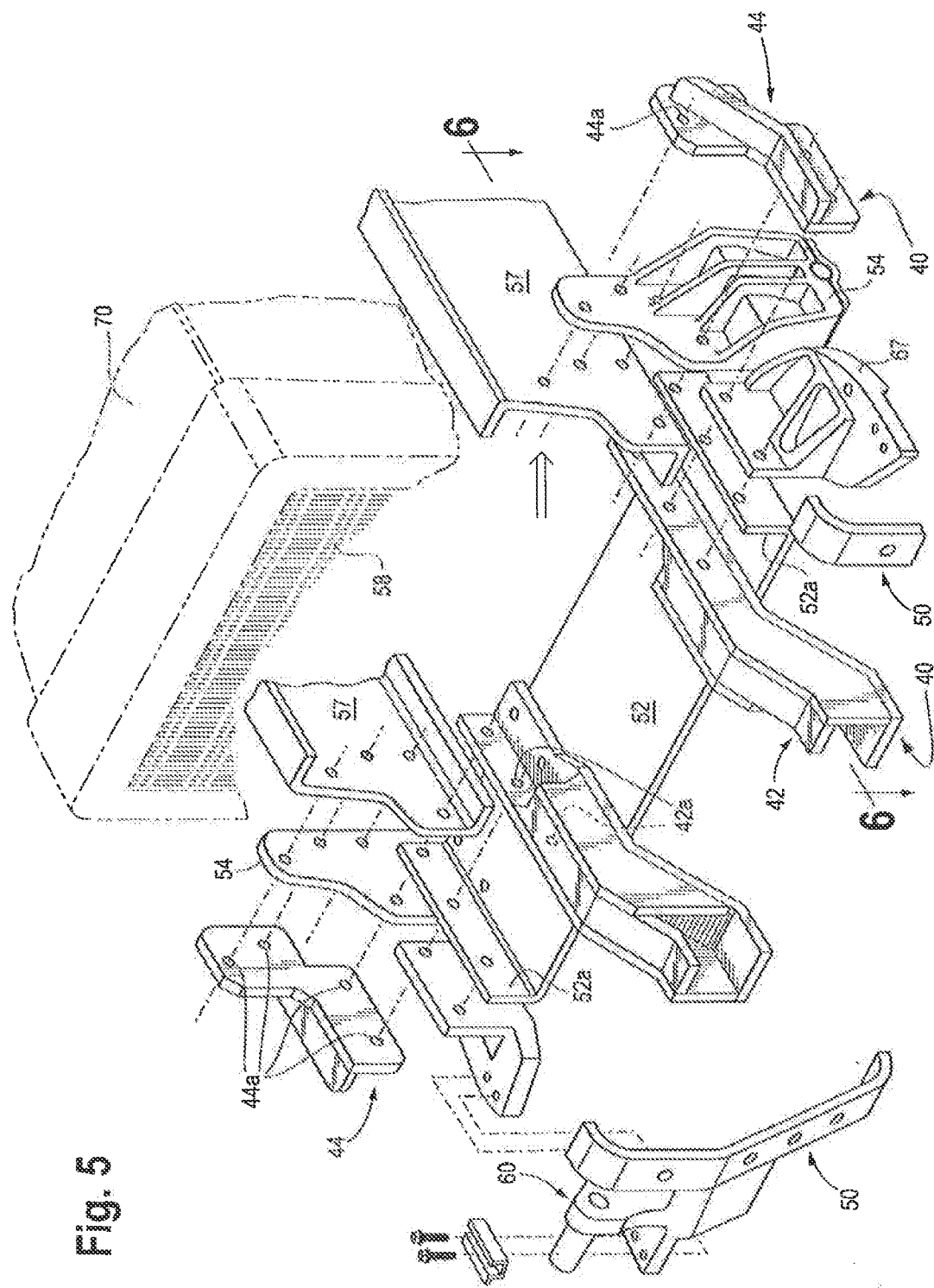
FIG. 5 is a parts perspective view of a preferred embodiment of the component parts of the present invention, shown in relation to structural components of the front end of the truck to which these parts attach.

Focusing now on the preferred embodiment of the invention, attachment mount 40 includes front member 42 and distribution member 44. In the preferred embodiment, front member 42 may be attached, such as by using fasteners such as bolts, to front bumper mounting bracket 50 and to front cross member and radiator support 52 (at its front-most portion), and to the front portion of distribution member 44 (as well as hood bracket 60 and spring bracket 54, at its rear-most portion), using apertures 42a, as best shown in FIG. 5, Likewise, distribution member 44 may be attached, such as by using fasteners such as bolts, to main frame/chassis portion 57 (at the top, rear portion of member 44), and to front bumper mounting bracket 50, spring bracket 54 and to the rear portion of front member 42 (at the front portion of member 44), using apertures 44a, as also best shown in FIG. 5.

Figure 6:
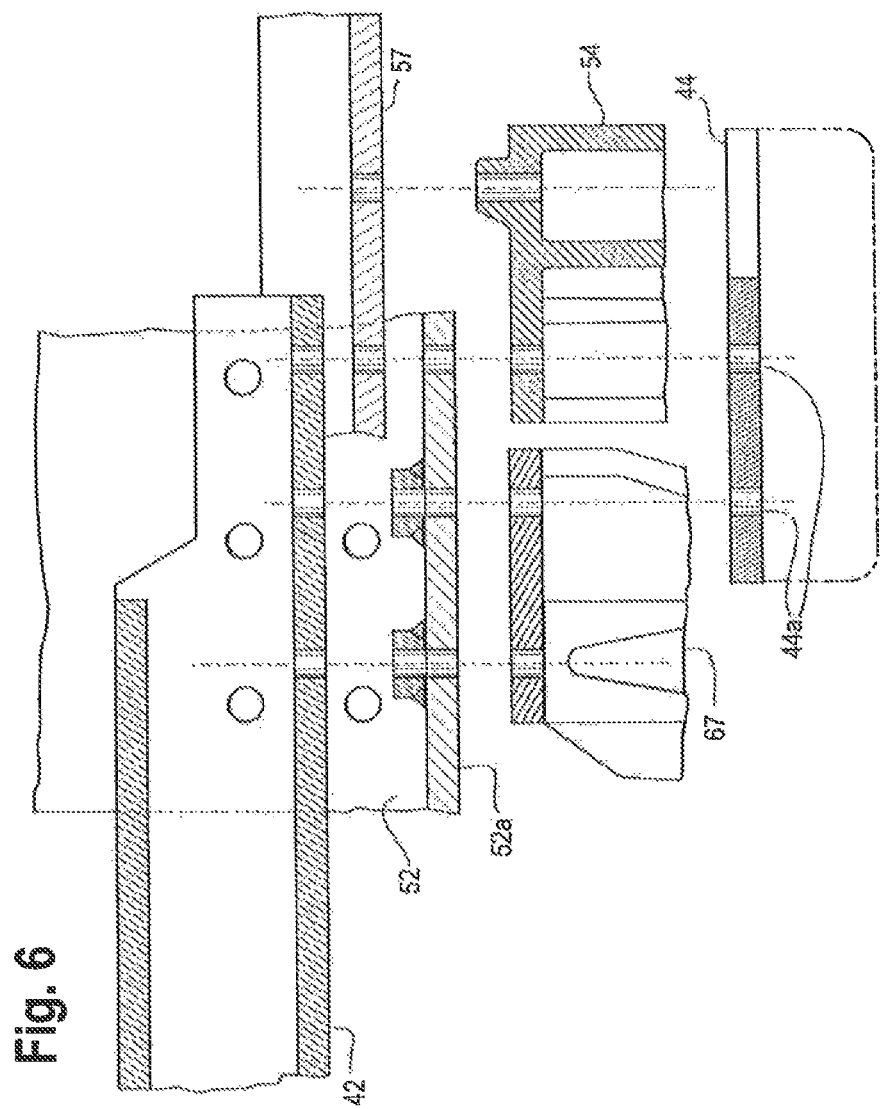
FIG. 6 is a plan section taken along reference line 6-6 of FIG. 5.

Referring to FIG. 6, this is a parts view showing, in the preferred embodiment, how the driver's side attachment mount may be attached and mounted to the vehicle chassis.

It will be understood that the portions of attachments mount 40 are thus tied to each other, and also tied to major structural components, including the main frame/chassis, of the truck, to ensure strength and durability. Also, the design does not necessarily require that any existing truck components be removed or disassembled, other than that existing bolts passing through apertures 42a and 44a be removed and replaced with longer bolts.

In the preferred embodiment disclosed in the drawings, the two pairs of attachment mounts 40, following welding and painting, weigh about 58 pounds. Preferably, the attachment mounts will weigh less than about 100 pounds, and most preferably they will weigh less than about 75 pounds. This will enable after-market laborers to quickly and easily manipulate and attach the mounts.

The present invention may be used with Class 4, 5, 6, 7 and 8 trucks. The invention is particularly applicable for Class 6 and Class 7 trucks which have width-tapering front portion chassis. However, the invention may also be used with full-size frames, such as Class 4, 5, 6, 7 and 8 trucks with full-size frames. (Currently all Class 8 trucks use full-size frames to the bumper, for example.) The present invention may also find future advantage with emission designs applicable to future trucks, such future Class 8 trucks used as auto transporters that have racks mounted over the cab.

Persons of ordinary skill in the art will recognize that attachment mounts with other shapes, sizes and configurations than those shown here may be used, and still fall within the scope of the below claims. For example, front members 42 may include full tubes at a front portion of the member, or front-portion partial tubes that are C-shaped or flattened-V shaped in cross-section, rather than the U-shaped cross-section that is shown. Also, the attachment mount members may be attached to different portions of the front of the truck, as long as they are tied into major structural components of the main frame, and the distribution and front members are tied to each other, to ensure adequate strength and durability. While one-half inch steel was used to fabricate the preferred embodiment, it will be understood that other thicknesses and types of materials may be used, if desired.

Figure 7B:
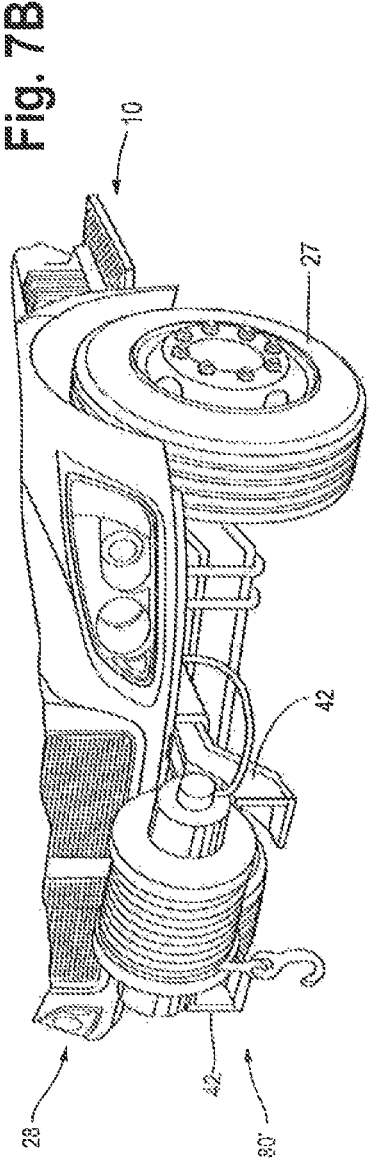
Figure 7C:
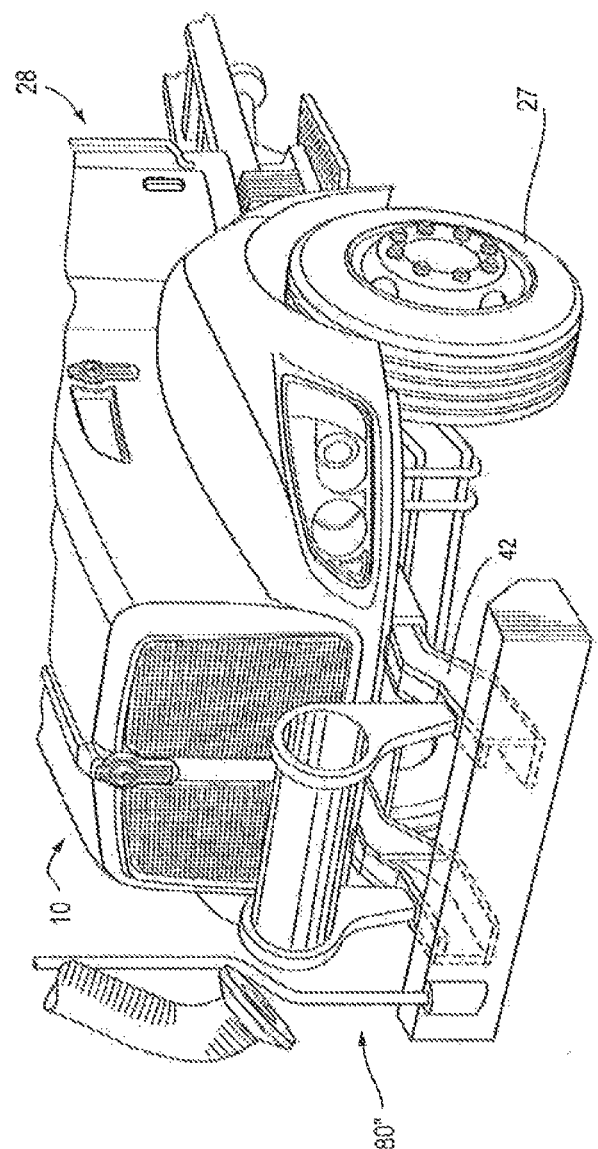

Referring to FIGS. 7A-7D front-end truck attachment 80 may include one or more of the following: a snow plow 80 (FIG. 7A); a winch 80 (FIG. 7B); a bumper extension 80" for a pump or pump motor (FIG. 7C); and a cab rack 80" for supporting vehicles (FIG. 7D).

The above description is not intended to limit the meaning of the words used in the following claims that define the invention. Persons of ordinary skill in the art will understand that a variety of other designs still falling within the scope of the following claims may be envisioned and used. It is contemplated that future modifications in structure, function, or result will exist that are not substantial changes and that all such insubstantial changes in what is claimed are intended to be covered by the claims,

The invention claimed is:

1. A method for securing an attachment mount to the front end of a Class 4-8 truck having a vehicle chassis reduced in height, at its front portion, the vehicle chassis having a chassis length extending along a length of the truck on a longitudinal axis, and the front-end truck attachment mount functioning to support a truck attachment, comprising the steps of:

providing one or more elongated front members (42, 52a) extending along the longitudinal axis and configured to support the front-end truck attachment, the one or more front members connecting at their first ends to inside and outside lateral surfaces (57) of the front portion of the vehicle chassis, and the one or more front members connecting at at least one of their second ends (42) to the truck attachment mount;

providing a distribution member (44) located at a front portion of the vehicle chassis, the distribution member connected at a first end to a lateral surface of the front portion of the vehicle chassis and at a second end, at least indirectly, to at least a portion of the one or more front members, wherein the distribution member is elongated in a direction extending along the longitudinal axis;

wherein the one or more front members and the distribution member comprise the attachment mount, and further comprising the step of connecting a front-end truck attachment to the attachment mount; and during use of the front-end truck attachment, the attachment mount spreads stresses originating from forces exerted on the front members by the front-end truck attachment, about the front portion of the vehicle chassis.

2. The method of claim 1, wherein during the process of securing the attachment mount to the front end of the truck, the only preexisting truck parts that are removed and replaced are fasteners.

3. The method of claim 1, wherein the attachment mount is used to support one or more of the following front-end truck attachments: a snow plow; a winch; a blade; a bumper extension for a pump or pump motor; and a cab rack for supporting vehicles.

4. The method of claim 1, wherein he truck is a Class 6-8 truck.

5. The method of claim 1, wherein the vehicle chassis has a reduced cross-section, width-wise, at its front portion.

6. The method of claim 1, wherein the one or more front members are attached to a bumper bracket of the truck.

7. The method of claim 1, wherein at least one of the front members is connected to the distribution member through a spring bracket.

8. The method of claim 1, wherein the attachment mount accommodates trucks having differing vehicle chassis widths.

9. The method of claim 1, wherein the attachment mount comprises a left and right pair of mounts, with each left and right pair comprising the one or more front members and the distribution member.

10. The method of claim 1, wherein the attachment mount weighs less than 100 pounds.

11. The method of claim 1 wherein the attachment mount weighs less than 75 pounds.

* * * * *